Sept. 21, 1965 J. KILBURG 3,207,453

TAPE MAGAZINE FOR AUTOMATIC TELEPHONE DIALER

Filed April 27, 1962 2 Sheets-Sheet 1

INVENTOR.
JAMES KILBURG
BY
Fryer + Tjensvold
ATTORNEY

Sept. 21, 1965 J. KILBURG 3,207,453

TAPE MAGAZINE FOR AUTOMATIC TELEPHONE DIALER

Filed April 27, 1962 2 Sheets-Sheet 2

INVENTOR.
JAMES KILBURG
BY
Fryer & Tjensvold
ATTORNEY

3,207,453
TAPE MAGAZINE FOR AUTOMATIC TELEPHONE DIALER

James Kilburg, San Carlos, Calif., assignor to Dasa Corporation, a corporation of California Filed Apr. 27, 1962, Ser. No. 190,586
4 Claims. (Cl. 242—67.3)

This invention relates to the automatic dialing of telephone numbers and particularly to improvements in the means for supporting the tape or medium upon which telephone numbers are encoded to be decoded for creating impulses in a telephone circuit comparable to those created by the dial of a conventional telephone hand set.

In the art of automatic telephone dialing it is now known that a magnetizable medium in the form of a drum or tape may be used for completing a selected circuit in the telephone system. Telephone numbers are encoded on this tape by placing thereon magnetized areas the arrangement of each series of which represents the number of a subscriber to be called. Scanning of a series of such areas with a transducer and suitable circuits associated with the telephone circuit produces impulses comparable to those produced by a conventional dial.

Other dialers are known which employ a tape upon which telephone numbers or the like are coded by perforations therein and decoded by mechanical means which sense such perforations. The present invention is to be described in connection with the magnetic tape medium used in so-called magnetic type repertory dialers. However, it will be apparent as the description proceeds that the invention is not necessarily limited to use with such dialers but may be employed with other types of code media.

The tape or other coded medium of an automatic telephone dialer is recognized as containing intelligence of a personalized nature in that the numbers encoded thereon are those which are peculiar to or most frequently called by a single subscriber or group of subscribers as in a business establishment. It is, therefore, desirable that such tape be readily removable and replaceable from the automatic dialer unit in which it is used. With a readily removable tape, several tapes may be used with one dialer to enlarge the range of its use. The tape may be removed from a machine during servicing or repair thereof and installed in a substitute machine. A subscriber moving from one office to another may exchange the tapes used in the dialers of the old office and the new office.

Since tapes of the kind described are usually under tension, their removal and replacement requires skilled personnel to effect proper setting or adjusting of the tensioning means and it is, therefore, also desirable that the tape, together with its entire supporting and tensioning means be contained in a unitary structure or magazine removable and replaceable as a unit and interchangeable from one dialer to another.

It is an object of the present invention to provide a tape magazine for an automatic telephone dialer having all of the above mentioned advantages.

A further object of the invention is to provide such a magazine and tape support which presents opposite surfaces of the tape conveniently to display typed or written information on one side of the tape while a transducer reads or decodes from the opposite side of the tape.

Still further and more specific objects and advantages of the invention and the manner in which they are carried into practice are made apparent in the following specification wherein the invention is described in detail by reference to the accompanying drawings.

Figure 1:
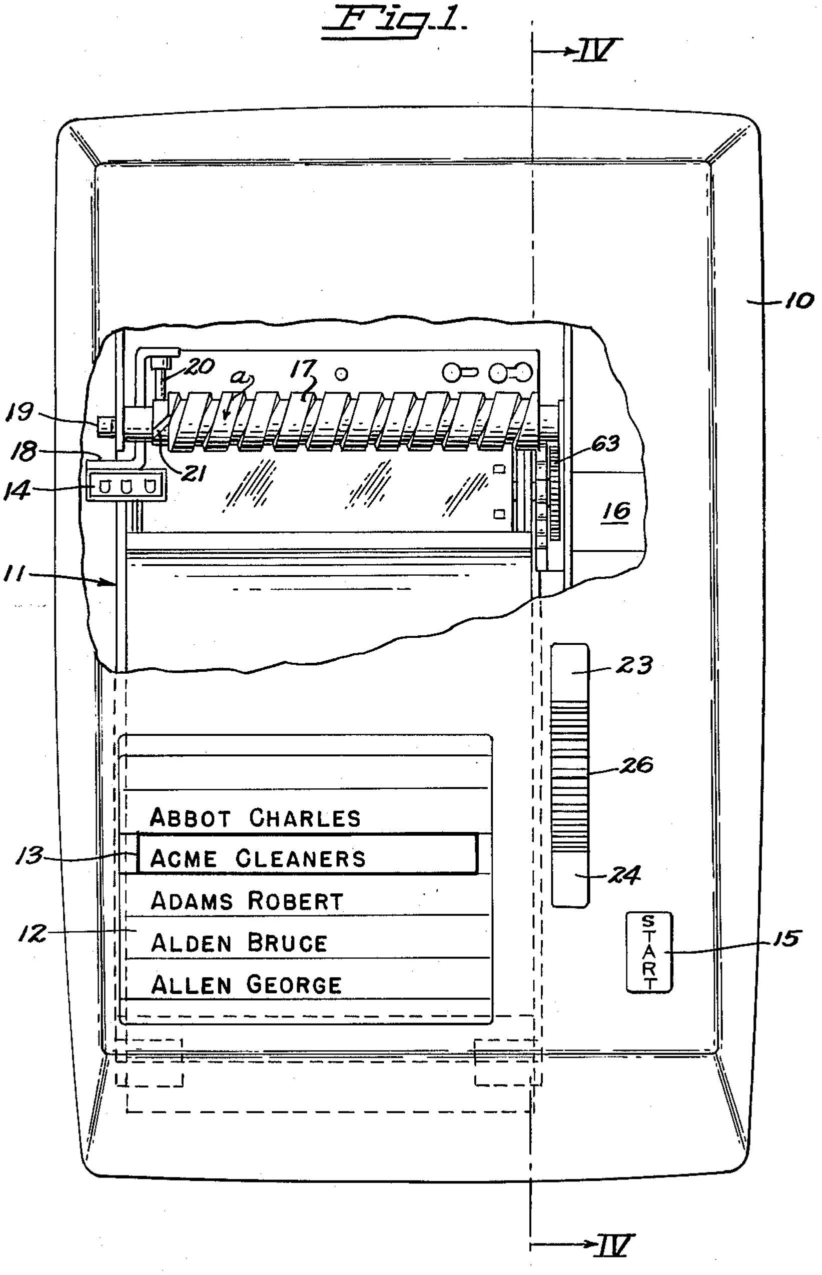
FIG. 1 is a plan view of an automatic telephone dialing machine embodying the present invention with a portion of the case broken away to show parts of the tape magazine and the relationship thereto of the viewing window and the transducer which serves to read or decode the telephone number of a party from one position on the tape whose name is in registry with a viewing window.

Referring first to FIG. 1 of the drawings, the tape magazine of the present invention, together with means for moving the tape, for actuating a transducer and suitable electronic circuits, are contained within a case shown at 10. The tape magazine, generally indicated at 11, is arranged within the case to expose a portion of the tape through a window 12 so that one of a plurality of names on the tape may be brought into registry with a locator frame 13. Another portion of the tape and, in this case, the opposite side thereof which is unprinted and provided with a magnetizable coating is disposed beneath a transducer head 14 and mechanism for advancing it across the tape for the purpose of reading or decoding signals representing telephone numbers which are in the form of suitably spaced and grouped magnetic signals on the tape.

The reading of signals from a magnetizable tape and converting them to impulses in a telephone circuit is well known and the driving mechanism for the tape as well as for the transducer which reads the signals form no part of the present invention but a brief description of the general operation of the machine will be given to facilitate an understanding of the many advantages of the tape magazine to which the present invention is directed.

Referring to FIG. 1, a signal corresponding to the telephone number of the party whose name appears in the frame 13 has been encoded transversely of the tape in line with the transducer 14. In order to decode that signal, depression of a start button 15 energizes a motor to drive transmission gearing all contained within a housing partially shown at 16 to impart rotary movement to a drive screw 17 in the direction of the arrow "*a*." The transducer is disposed upon a carriage 18 which is slidable upon a shaft 19 underlying the drive screw 17 and extending throughout the full length thereof. On the opposite side of the drive screw, a portion of the same carriage 18 carries a pin 20 shown as resting upon a cylindrical end of the drive screw which has a protruding cam 21 thereon. Thus upon initiation of rotation of the drive screw when the cam 21 strikes the pin 20, it moves it toward the right, as illustrated, into the lead portion of the thread on the drive screw which commences to drive the carriage transversely with respect to the tape with the transducer in contact with the tape directly over the area upon which the signal is disposed. In the machine disclosed the tape is advanced or adjusted by means of a forward button 23 and a reverse button 24. These buttons are depressible to effect energization of the motor and conditioning of forward and reverse drive mechanism to drive a tape sprocket presently to be described in detail. The tape may be advanced one space at a time by movement in one direction or another of the serrated face of a lever 26 disposed between the depressible buttons 23 and 24.

The present invention is directed to means for supporting the tape and tape adjusting mechanism in such a manner that it may be removed from the machine as a unit or in the form of a separable magazine. The magazine comprises a base plate 30 and side plates 31 between which are supported shafts 32 and 33 for a pair of spools upon which the tape is wound. These spools shown at 34 and 35 are tensioned by springs 36 and 37 and interconnected by a train of gears, one of which is shown at 38, in a manner fully disclosed in my co-pending application entitled "Support Means for Adjustable Tapes," Serial No. 114,754, filed July 5, 1961. The tape is led from the spool 35 upwardly over a roller 40 thence across a table 41 where it is exposed behind the window 12 of FIG. 1, and this side of the tape is coated to produce a light color upon which spaced lines are printed and upon which the names of subscribers may be either typed or written. The window 12 of FIG. 1 may be removed to enable writing on the tape with the table 41 supporting it. The tape then passes over a roller 42, thence downwardly over a roller 43, thence rearwardly over a combined drum and sprocket 44 so that upon passing to the spool 34, its opposite or magnetizable surface is exposed on the drum 44 and directly beneath the transducer 14, the position of which is indicated in dotted lines in FIG. 2.

Figure 2:
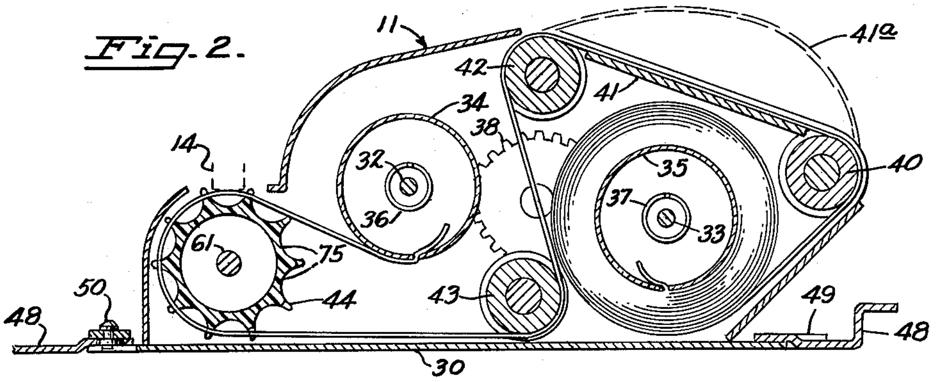
FIG. 2 is a vertical longitudinal section of the film magazine shown on a portion of the base plate of the case of FIG. 1 through which it is inserted and removed.
Figure 3:
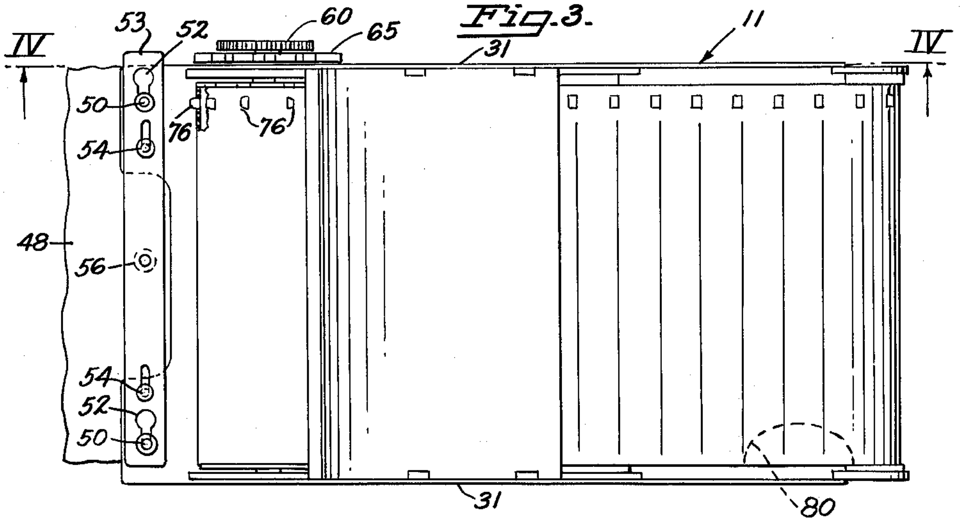
FIG. 3 is a plan view of the film magazine shown in FIG. 2.

The entire tape magazine is supported with respect to the bottom of the case 10, portions of which are shown at 48 in FIGS. 2 and 3 by a pair of tongues 49 at the forward edge of the base of the magazine extending through spaced slots in the base of the case and a pair of dowels 50 which extend upwardly from the magazine base 30 through suitable dowel holes in the base 48. These dowels are grooved for reception by the narrow portions of key slots 52 in a latch plate 53 which is slidably held on the base 48 by means of shoulder pins 54 in suitable slots. When the magazine is inserted and the dowel pins pass upwardly through the dowel holes, which insure perfect positioning of the magazine within the case, the latch plate 53 is in a position with the large portions of the key slots 52 registering with the dowel holes. The entire magazine is, therefore, latched in place by sliding of the latch plate 53 to the position shown in FIG. 3, a small knob to facilitate its sliding being shown at 56 in dotted lines in FIG. 3.

Figure 4:
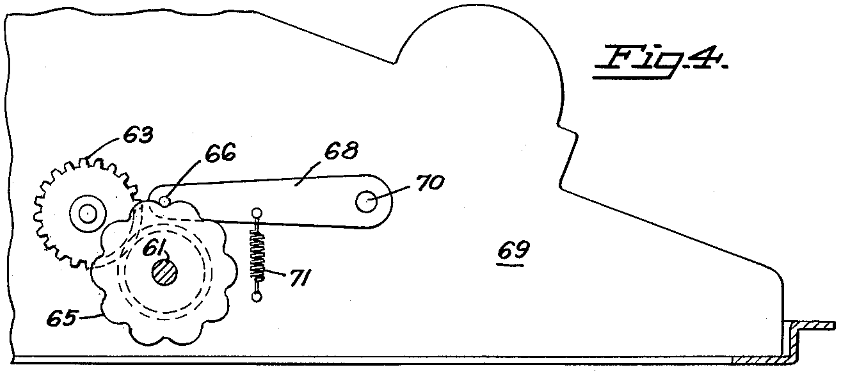
FIG. 4 is a fragmentary sectional view taken on the line IV—IV of FIGS. 1 and 3 and showing in the background a portion of the framework within the case which forms one wall of the cavity into which the tape magazine is inserted.

Upon inserting the tape magazine into the case, a drive connection for the tape must be established and this is accomplished, as is best illustrated in FIGS. 3 and 4, by a gear 60 fixed to the shaft 61 upon which the combination drum and sprocket 44 is mounted. Upon insertion of the magazine, this gear meshes with a gear 63, also shown in FIG. 1, which is driven by the motor and transmission (not shown) hereinabove referred to. Also fixed on the shaft 61 is a detent wheel 65 associated with a pin 66 on a lever 68 mounted on the side wall 69 of the cavity into which the magazine is inserted by a pivot pin 70 and urged downwardly as by a spring 71. The function of the detent wheel and detent 66 is to insure positioning of the portion of the tape with a coded telephone number thereon directly beneath the transducer 14 and with the associated name properly positioned within the frame 13 shown in FIG. 1. Thus it is simply necessary to insert the magazine into place where it is precisely positioned by the dowels 50 so that the gear 63 automatically meshes with the gear 60 and the detent pin 66 comes to rest on the detent wheel 65.

The drum 44 is designed to insure proper contact of the transducer 14 with the tape as the line of coded information on the tape is presented to the transducer head. This drum, as best shown in FIG. 2, is fluted to produce recesses or cavities as shown at 75 in FIG. 2, one of which registers directly beneath the transducer head when the tape is adjusted to any of its reading positions. At one end of the drum, teeth shown at 76 register in the manner of sprocket teeth with spaced perforations on one edge of the tape to effect driving thereof upon rotation of the drum. The natural stiffness of the tape causes it to bridge the fluted recess 75 as it passes over the drum 44 producing a slight resilient bridge or arcuate contour which is particularly important at that portion of the tape which underlies the transducer. It is necessary that the transducer be in intimate contact with the tape during a reading or decoding operation and, as is well known, typing upon or even writing on a tape of this nature tends to form indentations therein and since the typing or writing is done on one face of the tape which is presented over the table 41, any indentations so formed will produce ridges on the opposite or sensitized surface of the tape presented to the transducer head over the drum 44. Consequently such indentations even though not positioned directly behind the magnetized strip of the tape and, even though very minute, may effect separation or space between the tape and the transducer head which will result in faulty contact. This bridge-like arch in the tape which is provided by the special configuration of the drum 44 produces a resilient cushion so that the transducer may be brought into contact with the tape with sufficient force to deflect the arched portion downwardly producing a resilient force tending to maintain the tape in intimate contact with the transducer. A stronger signal has been found to result from this construction than when a solid backing member is placed behind the tape.

One of the principal advantages of the present invention is that it is possible for an unskilled person to remove the entire tape magazine from a dialing machine for any of the several purposes mentioned above, one of which is for entering new names upon the tape when new numbers are to be placed thereon in code. While it is possible simply to remove the window 12 and write a name to be added in pen or pencil upon the face of the tape, it is desirable that the names be typed particularly if several names are being entered at the same time. Because of the balanced spring pressure tending to wind the tape on both of the drums 34 and 35, there is a constant tension on the tape in its usual service. However when the magazine is removed from the machine, the tape directly over the table 41 may be grasped and pulled away from the table to a position such as that indicated in dotted lines at 41*a* in FIG. 2. This effects increased tension of both of the springs in the spools 34 and 35 but this tension is sufficiently slight that the tape may easily be withdrawn in a loop of a foot or more in length. Thus by removing the platen from a typewriter and inserting it through this loop before the platen is restored to the typewriter, it is a simple matter to type upon the face of the tape the names and telephone numbers which are exposed through the window 12.

It is desirable that the telephone numbers be displayed together with the subscribers' names because errors occur in the telephone system which necessitate an operator to inquire what number is being called. Consequently the calling party has merely to refer to the tape to give a proper reply. In order to facilitate drawing the tape away from the table to form a loop in the manner described, one edge of the table is recessed as shown in dotted lines at 80 in FIG. 3 to enable a finger to be inserted readily beneath the edge of the tape.

I claim:

1. In a repertory dialer having drive means and utilizing a record medium of tape-like form in combination with a magnetic transducer to produce electrical signals corresponding to selected telephone numbers, a magazine for such record medium, comprising:

(a) a base plate, a first and a second feed spool and a flutted drum rotatably disposed parallel to each other and to the base plate;

(b) means for attaching the first end of the record medium to the first feed spool and the second end of the record medium to the second feed spool, the record medium overlying at least a portion of the fluted drum;

(c) means operative on the first and second feed spool normally to hold them in any set angular position relative to each other; and, (d) means for coupling the base plate to the repertory dialer to press the magnetic transducer into intimate contact with the record medium between a pair of adjacent flutes on the fluted drum and, simultaneously, to engage the fluted drum with the drive means in the repertory dialer.

2. A magazine as in claim 1 having additionally, (a) a plurality of idler rollers over which the record medium is threaded, the surface of the record medium in the run between a selected pair of such idler rollers being the surface removed from the surface in contact with the magnetic transducer; and, (b) a platen underlying the run to permit writing on the portion of the record medium there exposed.

3. A magazine as in claim 2 wherein the spacing between adjacent flutes on the fluted drum substantially equals the spacing between adjacent ones of a plurality of parallel transverse lines formed on the surface of the record medium, and having, additionally, detent means coacting with the fluted drum finally to position the fluted drum relative to the magnetic transducer.

4. A magazine as in claim 3 wherein the fluted drum is adapted to operate as a sprocket wheel with respect to sprocket holes formed adjacent to one edge of the record medium.

References Cited by the Examiner

UNITED STATES PATENTS

| | | | |
|---|---|---|---|
| 1,944,023 | 1/34 | Ford | 242—71.2 X |
| 2,045,249 | 6/36 | Petersen et al. | 242—67.3 |
| 2,095,293 | 10/37 | Sherman | 226—79 X |
| 2,095,750 | 10/37 | Kiel | 274—11 |
| 2,153,529 | 4/39 | Rouse | 274—11 |
| 2,258,106 | 10/41 | Bryce | 274—41.4 |
| 2,460,411 | 2/49 | Calvert | 274—11 |
| 2,560,564 | 7/51 | Foster et al. | 242—55.13 X |
| 2,584,733 | 2/52 | Owens | 242—55.13 |
| 2,656,417 | 10/53 | Kilburg | 179—90.1 |
| 2,677,728 | 5/54 | Kolb et al. | 346—74 |
| 2,686,013 | 8/54 | Christian | 242—67.3 |
| 2,812,948 | 11/57 | Roberts | 179—100.2 X |
| 2,819,071 | 1/58 | Dietz et al. | 226—76 |
| 2,879,128 | 3/59 | Albright | 346—136 X |
| 2,916,072 | 12/59 | Hallam | 226—86 X |
| 2,987,265 | 6/61 | Quinones | 242—67.3 |
| 2,994,857 | 8/61 | Giel | 179—100.2 X |
| 3,028,063 | 4/62 | Busch et al. | 226—76 |
| 3,034,241 | 5/62 | Kossor et al. | 40—53 |
| 3,066,881 | 12/62 | Krueger | 242—67.3 X |
| 3,104,288 | 9/63 | Kobler | 179—90.2 |

FOREIGN PATENTS

| | | |
|---|---|---|
| 635,133 | 4/50 | Great Britain. |

MERVIN STEIN, *Primary Examiner.*

HARRISON R. MOSELEY, *Examiner.*